United States Patent
Selvaraj et al.

(10) Patent No.: US 12,497,586 B2
(45) Date of Patent: Dec. 16, 2025

(54) BIOREACTOR APPARATUS AND OPERATION METHOD THEREOF

(71) Applicant: Cytiva Sweden AB, Uppsala (SE)

(72) Inventors: Shivakumar Selvaraj, Bengaluru (IN); Bineesh Kandoth, Bengaluru (IN); Sahebagouda Alagur, Bengaluru (IN); Nagaraj Raghavendra Rao, Bengaluru (IN); Thomas Falkman, Uppsala (SE)

(73) Assignee: CYTIVA SWEDEN AB, Uppsala (SE)

( * ) Notice: Subject to any disclaimer, the term of this patent is extended or adjusted under 35 U.S.C. 154(b) by 882 days.

(21) Appl. No.: 17/763,860

(22) PCT Filed: Oct. 1, 2020

(86) PCT No.: PCT/EP2020/077470
§ 371 (c)(1),
(2) Date: Mar. 25, 2022

(87) PCT Pub. No.: WO2021/069287
PCT Pub. Date: Apr. 15, 2021

(65) Prior Publication Data
US 2022/0403318 A1    Dec. 22, 2022

(30) Foreign Application Priority Data
Oct. 11, 2019 (IN) .............................. 201911041306

(51) Int. Cl.
*C12M 1/36* (2006.01)
*C12M 1/00* (2006.01)
*C12M 1/34* (2006.01)

(52) U.S. Cl.
CPC ............ *C12M 41/48* (2013.01); *C12M 29/06* (2013.01); *C12M 41/34* (2013.01)

(58) Field of Classification Search
CPC ...... C12M 41/48; C12M 41/34; C12M 41/32; C12M 29/06
See application file for complete search history.

(56) References Cited

U.S. PATENT DOCUMENTS

2006/0216818 A1    9/2006  Amano
2017/0349874 A1*  12/2017  Jaques .................. B01F 27/191
2017/0356022 A1*  12/2017  Khan ..................... C12M 47/10

FOREIGN PATENT DOCUMENTS

CA    2766902 A1    1/2011
CN    101735950 A   6/2010
(Continued)

OTHER PUBLICATIONS

PCT International Search Report and Written Opinion for PCT/EP2020/077470, mailed Feb. 4, 2021 (14 pages).
(Continued)

*Primary Examiner* — Michael L Hobbs
(74) *Attorney, Agent, or Firm* — Eversheds-Sutherland (US) LLP

(57) ABSTRACT

The present subject matter discloses a bioreactor apparatus. The bioreactor apparatus comprises a bioreactor vessel configured to culture cells. The bioreactor apparatus furthermore comprises a sensor configured to measure Dissolved Oxygen (DO) in the bioreactor vessel. The DO measurements comprise a plurality of DO values recorded at, at least, a plurality of time instances during operation of the bioreactor apparatus. The bioreactor apparatus furthermore comprises a controller configured to obtain the DO measurements. The controller furthermore is to determine, in real-time or approximately real-time, an oxygen mass transfer co-efficient (kLa) associated with the operation of the bioreactor apparatus. Furthermore, the controller is configured to control, in real-time or approximately real-time, at least one (Continued)

cell culture parameter associated with the operation of the bioreactor apparatus based on the kLa.

14 Claims, 4 Drawing Sheets

(56) References Cited

FOREIGN PATENT DOCUMENTS

| CN | 105658315 A | 6/2016 | |
|---|---|---|---|
| EP | 3062919 A1 * | 9/2016 | .......... B01F 13/0863 |
| EP | 3062919 B1 | 9/2016 | |
| JP | 2019110767 | 7/2019 | |

OTHER PUBLICATIONS

James Kane, "Measuring kla for Better Bioreactor Performance", Feb. 1, 2012 (Feb. 1, 2012), XP002801798, Retrieved from the Internet: URL:https://bioprocessintl.com/upstream-processing/bioreactors/measuring-kla-for-bet ter-bioreactor-performance-328029/.

Garcia-Ochoa F et al. "Bioreactor scale-up and oxygen transfer rate in microbial processes: An overview", Biotechnology Advances, Elsevier Publishing, Barking, GB, vol. 27, No. 2, Mar. 1, 2009 (Mar. 1, 2009).

Japanese Office Action for corresponding JP Application No. 2022-515573, mailed Sep. 2, 2024 (8 pages).

Chinese Office Action and Search Report in corresponding CN Application No. 202080070700.1, dated Nov. 28, 2024; 12 pages.

* cited by examiner

BIOREACTOR APPARATUS AND OPERATION METHOD THEREOF

CROSS REFERENCE TO RELATED APPLICATIONS

This application claims the priority benefit of PCT/EP2020/077470, filed on Oct. 1, 2020, which claims the priority benefit of IN Application No. 201911041306 filed on Oct. 11, 2019, the entire contents of which are incorporated herein by reference.

TECHNICAL FIELD

The present subject matter relates generally to bioreactor apparatuses and more particularly to, aeration processes of a bioreactor apparatus.

BACKGROUND

In cell culture processes carried out in bioreactor apparatuses, maintenance of cell culture parameters, such as, for example, pH, Dissolved Oxygen (DO), Variable Cell Density (VCD), at a desired level is of prime importance. Using at least one of the aforementioned cell culture parameters, for example, the DO, other factors that may also affect the operation of the cell culture process may be determined. An example of such factor is mass-transfer coefficient of oxygen (kLa). kLa is indicative of the rate at which the oxygen is getting consumed by the cells during the cell culture processes. Determining kLa and controlling the cell culture based thereon, is of equal importance. Failure to do so may result in improper and unsatisfactory performance of the cell culture process.

Conventionally, manual approaches of monitoring and controlling the cell culture parameters or kLa is implemented. Such an approach involves, manually recording the DO value at various intervals, exporting the values to external user equipment (UE), such as a desktop computer, and subsequently performing analytical techniques onto said measurements for determining the kLa.

Owing to the dependency on the manual recording of the measurements, probability of an error arising due to human factor remains high. Accordingly, accuracy of the measurements and, in turn, the kLa may be degraded. Furthermore, the convention approach is cumbersome and time consuming. Accordingly, a delay may be introduced in the determination of the kLa and subsequent control of the cell culture parameters affecting the cell culture process. This delay may further affect the outcome of the cell culture process, which may not be a true representation of the performance of the cell culture process.

Furthermore, as the kLa values for different values of the cell culture parameters is not readily learnt, scalability of the bioreactor apparatus remains an issue.

SUMMARY

This summary is provided to introduce a selection of concepts in a simplified format that is further described in the detailed description of the present disclosure. This summary is neither intended to identify key inventive concepts of the disclosure nor is it intended for determining the scope of the invention or disclosure.

According to an embodiment of the present disclosure, a bioreactor apparatus is disclosed. The bioreactor apparatus comprises a bioreactor vessel configured to culture cells. The bioreactor apparatus furthermore comprises a sensor configured to measure Dissolved Oxygen (DO) in the bioreactor vessel. The DO measurements comprise a plurality of DO values recorded at, at least, a plurality of time instances during operation of the bioreactor apparatus. The bioreactor apparatus furthermore comprises a controller configured to obtain the DO measurements. The controller furthermore is to determine, in real-time or approximately real-time, an oxygen mass transfer co-efficient (kLa) associated with the operation of the bioreactor apparatus. Furthermore, the controller is configured to control, in real-time or approximately real-time, at least one cell culture parameter associated with the operation of the bioreactor apparatus based on the kLa.

According to another embodiment of the present disclosure, a method of operating a bioreactor apparatus is disclosed. The method comprises measuring, by a sensor, Dissolved Oxygen (DO) present in a bioreactor vessel of the bioreactor apparatus during an operation of the bioreactor apparatus. The DO measurements comprise a plurality of DO values recorded at, at least, a plurality of time instances during operation of the bioreactor apparatus. The method further comprises determining, in real-time or approximately real-time, by a controller, an oxygen mass transfer co-efficient (kLa) associated with the operation of the bioreactor apparatus. The method further comprises controlling, in real-time or approximately real-time, by the controller, at least one cell culture parameter associated with the operation of the bioreactor apparatus based on the kLa.

According to another embodiment of the present disclosure, non-transitory computer-readable medium having embodied thereon a computer program for executing a method implementable by a bioreactor apparatus is disclosed. The method is a method of operating the bioreactor apparatus. The method comprises measuring, by a sensor, Dissolved Oxygen (DO) present in a bioreactor vessel of the bioreactor apparatus during an operation of the bioreactor apparatus. The DO measurements comprise a plurality of DO values recorded at, at least, a plurality of time instances during operation of the bioreactor apparatus. The method further comprises determining, in real-time or approximately real-time, by a controller, an oxygen mass transfer co-efficient (kLa) associated with the operation of the bioreactor apparatus. The method further comprises controlling, in real-time or approximately real-time, by the controller, at least one cell culture parameter associated with the operation of the bioreactor apparatus based on the kLa.

The objects and advantages of the embodiments will be realized and achieved at least by the elements, features, and combinations particularly pointed out in the claims. It is to be understood that both the foregoing general description and the following detailed description are representative and explanatory and are not restrictive of the invention, as claimed.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
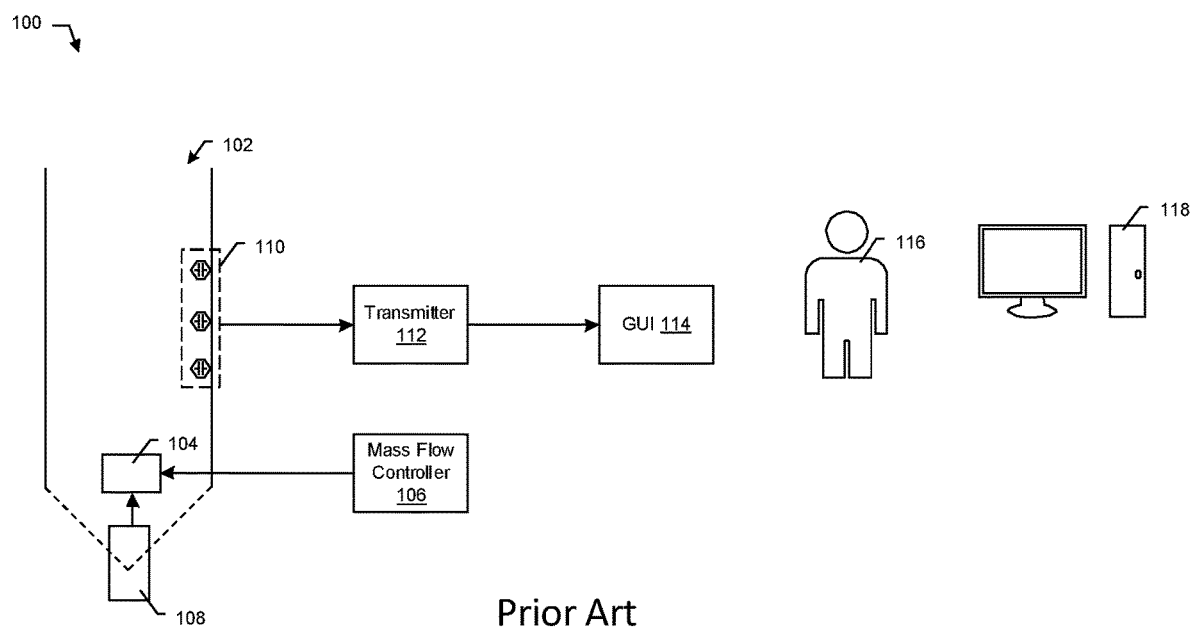
FIG. 1 illustrates a schematic diagram of a bioreactor apparatus, according to a prior art solution.

The elements in the drawings are illustrated for simplicity and may not have been necessarily been drawn to scale. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having benefit of the description herein.

DETAILED DESCRIPTION

For the purpose of promoting an understanding of the principles of the present disclosure, reference will now be made to the embodiment illustrated in the drawings and specific language will be used to describe the same. It will be understood that no limitation of the scope of the present disclosure is thereby intended, such alterations and further modifications in the illustrated system, and such further applications of the principles of the present disclosure as illustrated therein being contemplated as would normally occur to one skilled in the art to which the present disclosure relates.

The foregoing general description and the following detailed description are explanatory of the present disclosure and are not intended to be restrictive thereof.

Reference throughout this specification to "an aspect", "another aspect" or similar language means that a particular feature, structure, or characteristic described in connection with the embodiment is included in at least one embodiment of the present disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or subsystems or elements or structures or components proceeded by "comprises . . . a" does not, without more constraints, preclude the existence of other devices or other subsystems or other elements or other structures or other components or additional devices or additional subsystems or additional elements or additional structures or additional components.

Unless otherwise defined, all technical and scientific terms used herein have the same meaning as commonly understood by one of ordinary skill in the art to which this present disclosure belongs. The system, methods, and examples provided herein are illustrative only and not intended to be limiting.

FIG. 1 illustrates a schematic diagram of a bioreactor apparatus 100, according to a prior art solution. The bioreactor apparatus 100, amongst other things, comprises a bioreactor vessel 102 configured to facilitate cell culture processes. The bioreactor apparatus 100 furthermore comprises a sparger 104. The sparger 104, in an example, is to facilitate aeration within the bioreactor vessel 102 during a cell culture process. In a non-limiting example, the sparger 104 may be used for dispersing gases, such as oxygen, nitrogen, and carbon dioxide, into the bioreactor vessel 102. In an example, the sparger 104 may be a disc type or ring type structure comprising of a plurality of pores for dispersing said gases into the bioreactor vessel 102.

The bioreactor apparatus 100 furthermore comprises a mass flow controller 106 configured to provide the gases that are to be dispersed into the bioreactor vessel 102. To that end, the mass flow controller 106 may be operatively coupled to a gas unit (not shown in the figure). The gas unit provides the mass flow controller 106 with the gasses that are supplied to the bioreactor vessel 102. Said gases, in an example, are supplied into the bioreactor vessel 102 using the sparger 104. Herein, in an example, a mixer motor 108 may be used to control the operational speed of the sparger 104, thereby affecting control of the inflow of the gases into the bioreactor vessel 102.

The bioreactor apparatus 100 furthermore comprises a plurality of sensors 110. Examples of the sensors 110 may include, but are not limited to, a sensor for measuring Dissolved oxygen (DO), a sensor for measuring dissolved $CO_2$, and a sensor for measuring viable cell densities. The measurements from the sensors 110 are rendered or displayed on a Graphical User Interface 114, via a transmitter 112. Accordingly, the measurements may be recorded and analyzed by the user 116, for example, by using a User Equipment (UE) 118. Based on the analyzing, control inputs may be provided by the user 116 for adjusting one or more cell culture parameters. Examples of the cell culture parameters may include, but are not limited to, temperature, pH, DO, and the like. Typically, the user 116 may control the cell culture parameters by means of different user interfaces, in an example. For instance, a temperature control unit may be provided for controlling a temperature within the bioreactor vessel 102. Another user interface may be provided for controlling the mass flow controller 106 for controlling the inflow of gases into the bioreactor vessel 102.

As may be known, the step of analyzing the measurements is a cumbersome process involving recording the measurements from the sensors 110, exporting said measurements to the UE 118, implementing techniques on the measurements at the UE 118 for determining values of factors relevant to the control of the cell culture process. As an example, measurements associated with the DO may be recorded, exported, and analyzed for determining a value of oxygen mass transfer coefficient (kLa). Learning the value of kLa and maintaining the same at a desirable preset value is imperative for any cell culture process.

As may be understood, cultivation of cells or cell culturing is a critical process requiring accuracy of measurements. In cases where the recording of the measurements is done manually, probability of human induced errors affecting the measurements increases. Furthermore, the aforementioned method of determining kLA is a cumbersome and time consuming process. Accordingly, a delay may be introduced in learning the kLa values and subsequent controlling of the cell culture parameters based thereon, which may hamper the cell culture process. A yet another disadvantage of the aforementioned approach is the distributed mechanism of controlling the cell culture parameters, via different interfaces. Controlling the cell culture parameters through different interfaces, even if rendered on a single display, may result in a delay in affecting control of said parameters. This may again prove to be harmful to a cell culture process.

Figure 2A:
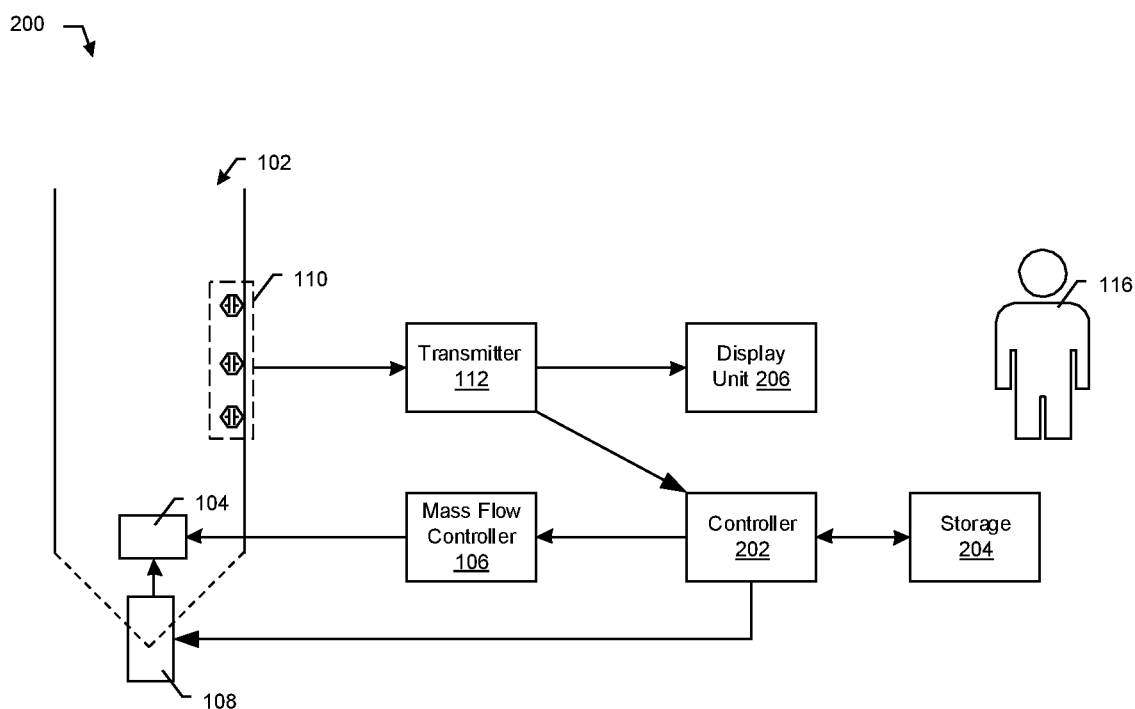
FIG. 2A illustrates a schematic diagram of a bioreactor apparatus, according to an embodiment of the present disclosure.

FIG. 2A illustrates a schematic diagram of a bioreactor apparatus 200, according to an embodiment of the present disclosure. The bioreactor 200, amongst other things, comprises a controller 202 and storage 204. The controller 202 can be a single processing unit or a number of units, all of which could include multiple computing units. The controller 202 may be implemented as one or more microprocessors, microcomputers, microcontrollers, digital signal processors, central processing units, graphical processing units, neural processing units, state machines, logic circuitries, and/or any devices that manipulate signals based on operational instructions. The storage 204, in an example, may include one or more of Read Only Memory (ROM), Random Access Memory (RAM), and any other type of data storage including but not limited to cloud storage. In an example, the storage 204 may include historic data, for example, measurements of the cell culture parameters recorded during previous operations of the bioreactor apparatus 200. Furthermore, the storage 204 may also include threshold/cut-off/preset values for different cell culture parameters including that of kLA. The bioreactor apparatus 200 furthermore comprises a display unit 206 for rendering data to the user 116. In an example, the display unit 206 may also be configured to receive user inputs from the user 116.

Figure 2B:
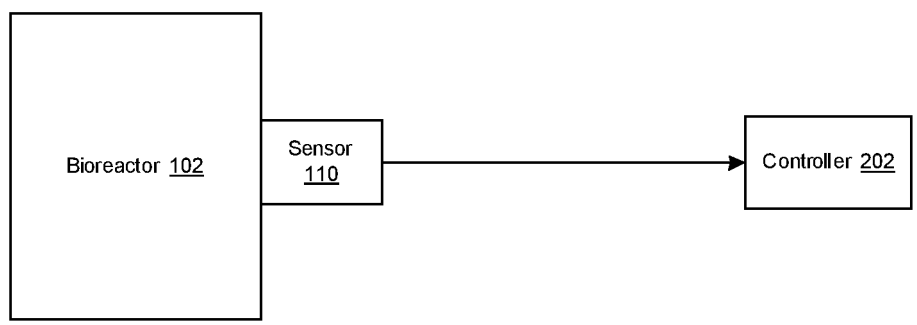
FIG. 2B illustrates a schematic block diagram of the bioreactor apparatus 200, according to an embodiment of the present disclosure.

FIG. 2B illustrates a schematic block diagram of the bioreactor apparatus 200, according to an embodiment of the present disclosure. As shown, the bioreactor apparatus 200 comprises the bioreactor vessel 102, the sensor 110, and the controller 110.

Referring to FIG. 2A and 2B, in an example, the user 116 seeking to perform a cell culture process using the bioreactor apparatus 200 may calibrate the bioreactor apparatus 200. Herein, the bioreactor vessel 102 may be configured to culture cells. In said calibration, to begin with, the user 116 may install a bag and other accessories into the bioreactor vessel 102. Subsequently, the user 116 may perform calibration of the sensors 110 and may perform an aseptic operation, for example, by steam sterilization of one or more components of the bioreactor apparatus 200. Thereafter, the user 116 may then prepare the media to be used for cell culture process. To that end, the user 116 may add the required substrates into the bioreactor vessel 102 and may make a homogenous slurry thereof, for the growth of cells. In an example, the media is added into the bag, which is subsequently connected to one or more of the sensors 110.

In a subsequent step, the user 116 may set a preset value and/or threshold values for one or more of the cell culture parameters, for example, pH, critical DO level, temperature, and the like. In an example, the user 116 may set the cell culture parameters using the display unit 206.

Continuing with the above calibration, in a subsequent step, the user 116 may then introduce the cells into the bioreactor vessel 102 to initiate the cell culture process. During the process, the cells start growing by utilizing the substrates in the media.

In an example embodiment, to check the performance of the process, the cell culture parameters may be monitored using the sensors 110. In an example, the monitoring may be done continuously. In another example, the monitoring may be done intermittently after preset time intervals. Furthermore, the step of monitoring includes measuring the values of the cell culture parameters by the sensors 110. The measured values are stored in the storage 204, in an example, and may further be displayed on the display unit 206.

According to an example embodiment, the operation of the bioreactor apparatus 200 may be controlled based on the kLa. In said example embodiment, the sensor 110 may measure the DO. Herein, the DO measurements comprise a plurality of DO values recorded at, at least, a plurality of time instances during operation of the bioreactor apparatus 200.

Furthermore, in said embodiment, the controller 202 may be configured to obtain the measurements corresponding to the DO, or DO measurements, from the storage 204. Subsequently, the controller 202 may determine, in real-time or approximately real-time, an oxygen mass transfer co-efficient (KLa) associated with the operation of the bioreactor apparatus 200.

In an example, for determining the kLa, the controller 202 may determine a plurality of log values based on the plurality of DO values and a plurality of time instances. Once the plurality of log values is determined, the controller 202 may determine the kLa based on the log values, for example, by using equation 1 given below.

$$\frac{kLa}{Hr} = \left[\frac{\log(\text{saturated } DO \text{ value} - \text{current process } DO \text{ value}) - \log(\text{Saturated } DO \text{ value} - \text{preceding process } DO \text{ value})}{(\text{time at current } DO - \text{time at preceding } DO)}\right] * 3600$$

In an example, the controller 202 may be further configured to display the kLa through the display unit 206.

In an example, the controller 202 may be configured to compare the kLa with a preset value of kLa. Herein, the preset value of the kLa may be set by the user 116, or may be determined based on historic operations of the bioreactor apparatus 200. For instance, the controller 202 may obtain details of previous similar operations and may accordingly set the preset value of the kLa. The term preset value, without limitation, may include a range of values as well. In an example where the controller 202 determines that the value of the kLa is different than the preset value of the kLa, the controller 202 may control an operational speed of the sparger 104 for controlling a flow rate of input oxygen into the bioreactor vessel. As mentioned earlier, the sparger 104 may be controller using the mixer motor 108. Accordingly, depending on whether the kLa is lower or higher than the preset value, the operational speed of the sparger 104 may be increased or decreased. Accordingly, the inflow of the oxygen is controlled. As a result, the kLa is maintained at the desired value.

In an example embodiment, the controller 202 may be further configured to compare, in real-time or approximately real-time, the DO measurements with historic DO measurements. The historic DO measurements comprise a plurality of DO values recorded during prior operation of the bioreactor apparatus. In an example, the controller 202 may obtain the historic DO measurements from the storage 204 and may subsequently compare the DO measurements with the historic DO measurements. In a case where the controller 202 may detect an anomaly associated with the DO based on the comparison, the controller 202 may be configured to provide an alert notification. In an example, the alert notification may be an audio, a video, an image, or a combination of the aforementioned. Furthermore, in an example, the alert notification may be provided through the display unit 206.

In an example embodiment, the controller 202 may be further configured to compare, in real-time or approximately real-time, the DO measurements with a predetermined threshold DO range. In an example, the controller 202 may obtain the predetermined threshold DO range from the storage 204 and may subsequently compare the DO measurements with the predetermined threshold DO range. In a case where the controller 202 may determine that a real-time value of the DO is outside the predetermined threshold DO range, based on the comparison, the controller 202 may be configured to provide an alert notification. In an example, the alert notification may be an audio, a video, an image, or a combination of the aforementioned. Furthermore, in an example, the alert notification may be provided through the display unit 206.

In an example embodiment, the controller 202 may be configured to compare, in real-time or approximately real-time, the DO measurements with historic DO measurements. Based on the comparison, the controller 202 may be configured to determine a comparative graph. The comparative graph, in an example, may be indicative of a performance of the operation in comparison to historic operations of the bioreactor apparatus 200. Furthermore, in an example, the controller 202 may display the comparative graph using the display unit 206.

Figure 3:
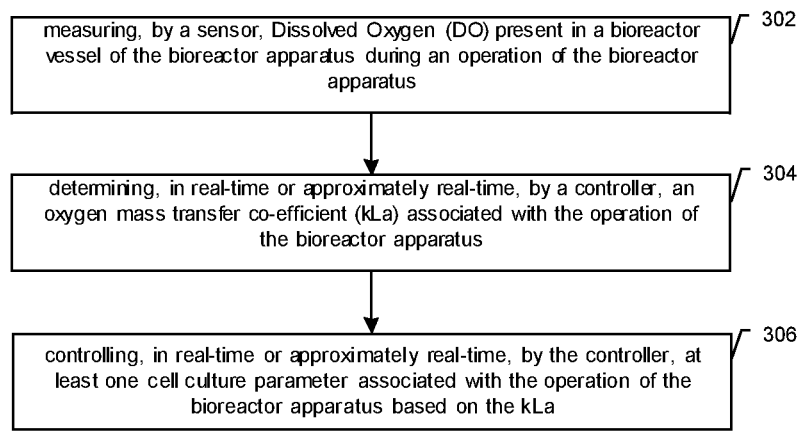
FIG. 3 illustrates a method 300, according to an embodiment of the present disclosure.

FIG. 3 illustrates a method 300, according to an embodiment of the present disclosure. The method 300 may be implemented by the bioreactor apparatus 200 using components thereof, as described above. Further, for the sake of brevity, details of the present subject matter that are explained in detail with reference to description of FIGS. 1, 2A, and 2B above are not explained in detail herein.

At step 302, Dissolved Oxygen (DO) present in a bioreactor vessel of the bioreactor apparatus during an operation of the bioreactor apparatus is measured by a sensor. In an example, the sensor 110 may measure the DO.

At step 304, an oxygen mass transfer co-efficient (kLa) associated with the operation of the bioreactor apparatus is determined, in real-time or approximately real-time, by a controller. In an example, the controller 202 may determine the kLa, for example by using the equation 1, as explained above.

At step 306, at least one cell culture parameter associated with the operation of the bioreactor apparatus is controlled based on the kLa, in real-time or approximately real-time, by the controller. Examples of the cell culture parameter may include, but are not limited to, pH, DO, $CO_2$, VCD, and the like. In an example, the controlling of the cell culture parameter may be done to maintain the kLa at a preset value. In another example, the controlling of the cell culture parameter may be done to achieve a desired value of the kLa.

In an example, the cell culture parameter may be the DO. In said example, the value of the kLa may be compared with the preset value of the kLa. The preset value may be a value set by a user. In another example, the preset value may be a value determined based on historic operations of the bioreactor apparatus for processes similar to the on-going process. Based on the comparing, i.e., whether the value of the kLa is greater than or less than the preset value, an operational speed of a sparger of the bioreactor apparatus may be controller for controlling a flow rate of input oxygen into the bioreactor vessel.

In an example embodiment, the DO measurements may be compared, in real-time or approximately real-time, with historic DO measurements. The historic DO measurements comprise a plurality of DO values recorded during prior operation of the bioreactor apparatus. In a case where an anomaly associated with the DO is detected based on the comparison, an alert notification may be provided. In an example, the alert notification may be an audio, a video, an image, or a combination of the aforementioned. Furthermore, in an example, the alert notification may be provided through a display unit, such as the display unit 206, of the bioreactor apparatus.

In an example embodiment, the DO measurements may be compared, in real-time or approximately real-time, with a predetermined threshold DO range. In a case where it is determined that a real-time value of the DO is outside the predetermined threshold DO range, based on the comparison, an alert notification may be provided. In an example, the alert notification may be provided through the display unit.

In an example embodiment, the DO measurements may be compared, in real-time or approximately real-time, with historic DO measurements. Based on the comparison, a comparative graph may be determined, for example, using a predetermined comparison and/or analytical technique. The comparative graph, in an example, may be indicative of a performance of the operation in comparison to historic operations of the bioreactor apparatus. Subsequently, in an example, the comparative graph may be displayed using the display unit.

As may be gathered from above, the value of kLa is learnt in real time and probability of human error is mitigated. Furthermore, the number of iteration involved with determination of kLa may be reduced. Furthermore, effect of variance of each cell culture parameter on kLa may be determined in real time and said parameters may be controlled in real time. Furthermore, the aspects described herein provide for a faster turnaround time for determination of kLa, resulting in faster cell culture process turnaround time. Furthermore, the aspects described herein provide for scalability of the bioreactor apparatus. For instance, when other components, such as media, gases, sparger rate and all are increased, their effect on the value of kLa can be seen in real time. Accordingly, their values may be changed appropriately so as to maintain the kLa value. Thus, scalability of the bioreactor apparatus is achieved with ease.

Terms used in this disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description of embodiments, claims, or drawings, should be understood to contemplate the possibilities of including one of the terms, either of the terms or both terms. For example, the phrase "A or B" should be understood to include the possibilities of "A" or "B" or "A and B."

All examples and conditional language recited in this disclosure are intended for pedagogical objects to aid the reader in understanding the invention and the concepts contributed by the inventor to furthering the art and are to be construed as being without limitation to such specifically recited examples and conditions. Although embodiments of the present disclosure have been described in detail, it should be understood that various changes, substitutions, and alterations could be made thereto without departing from the spirit and scope of the present disclosure.

We claim:

1. A bioreactor apparatus, comprising:
   a bioreactor vessel configured to culture cells;
   a sensor configured to measure Dissolved Oxygen (DO) in the bioreactor vessel; and
   a controller configured to:
      obtain the DO measurements, the DO measurements comprising a plurality of DO values recorded at, at least, a plurality of time instances during operation of the bioreactor apparatus;
      determine, in real-time, an oxygen mass transfer co-efficient (kLa) associated with the operation of the bioreactor apparatus; and
      control, in real-time, at least one cell culture parameter associated with the operation of the bioreactor apparatus based on the kLa.

2. The bioreactor apparatus of claim 1, wherein the controller is further configured to:
   determine a plurality of log values based on the plurality of DO values and the plurality of time instances; and
   determine, in real-time, the kLa based on the plurality of log values.

3. The bioreactor apparatus of claim 1, wherein the bioreactor apparatus further comprises a sparger coupled with the bioreactor vessel, wherein the at least one cell culture parameter is the DO, wherein the controller is configured to:
   compare a value of kLa with a preset value of kLa; and
   control an operational speed of the sparger for controlling a flow rate of input oxygen into the bioreactor vessel, when the value of the kLa is different from the preset value of the kLa.

4. The bioreactor apparatus of claim 1, wherein the controller is further configured to:
   compare, in real-time, the DO measurements with historic DO measurements, wherein the historic DO measurements comprises a plurality of DO values recorded during previous operations of the bioreactor apparatus;
   detect an anomaly associated with the DO based on the comparison of the DO measurements with the historic DO measurements; and
   provide an alert notification in response to the detection of the anomaly.

5. The bioreactor apparatus of claim 1, wherein the controller is further configured to:
   compare, in real-time, the DO measurements with a predetermined threshold DO range;
   determine that a real-time value of the DO is outside the predetermined threshold DO range; and
   provide an alert notification in response to the determining that the real-time value of the DO is outside the predetermined threshold DO range.

6. The bioreactor apparatus of claim 1, wherein the bioreactor apparatus further comprises a display unit, wherein the controller is further configured to display the kLa through the display unit.

7. The bioreactor apparatus of claim 6, wherein the controller is further configured to:
   compare, in real-time, the DO measurements with historic DO measurements, wherein the historic DO measurements comprises a plurality of DO values recorded during previous operations of the bioreactor apparatus;
   determine a comparative graph based on the comparison, wherein the comparative graph is indicative of a performance of a current operation in comparison to historic operations of the bioreactor apparatus; and
   display the comparative graph using the display unit.

8. A method of operating a bioreactor apparatus, the method comprising:
   measuring, by a sensor, Dissolved Oxygen (DO) present in a bioreactor vessel of the bioreactor apparatus during an operation of the bioreactor apparatus, wherein DO measurements comprise a plurality of DO values recorded at, at least, a plurality of time instances during the operation of the bioreactor apparatus;
   determining, in real-time, by a controller, an oxygen mass transfer co-efficient (kLa) associated with the operation of the bioreactor apparatus; and
   controlling, in real-time, by the controller, at least one cell culture parameter associated with the operation of the bioreactor apparatus based on the kLa.

9. The method as claimed in claim 8, wherein the step of determining further comprises:
   determining a plurality of log values based on the plurality of DO values and the plurality of time instances; and
   determining, in real-time, the kLa based on the plurality of log values.

10. The method as claimed in claim 8, wherein the bioreactor apparatus further comprises a sparger coupled with the bioreactor vessel, wherein the at least one cell culture parameter is DO, wherein the method further comprises:
    comparing a value of kLa with a preset value of kLa; and
    controlling an operational speed of the sparger for controlling a flow rate of input oxygen into the bioreactor vessel, when the value of the kLa is different from the preset value of the kLa.

11. The method as claimed in claim 8, wherein the method further comprises:
    comparing, in real-time, the DO measurements with historic DO measurements, wherein the historic DO measurements comprises a plurality of DO values recorded during previous operations of the bioreactor apparatus;
    detecting an anomaly associated with the DO based on the comparison of the DO measurements with the historic DO measurements; and
    providing an alert notification in response to the detection of the anomaly.

12. The method as claimed in claim 8, wherein the method further comprises:
    comparing, in real-time, the DO measurements with a predetermined threshold DO range;

determining that a real-time value of the DO is outside the predetermined threshold DO range; and providing an alert notification in response to the determining that the real-time value of the DO is outside the predetermined threshold DO range.

13. The method as claimed in claim 8, wherein the method further comprises displaying the kLa through a display unit.

14. The method as claimed in claim 13, wherein the method further comprises:

comparing, in real-time, the DO measurements with historic DO measurements, wherein the historic DO measurements comprises a plurality of DO values recorded during previous operations of the bioreactor apparatus;

determining a comparative graph based on the comparison, wherein the comparative graph is indicative of a performance of the operation in comparison to historic operations of the bioreactor apparatus; and displaying the comparative graph using the display unit.

* * * * *